Sept. 12, 1933.    W. S. EATON    1,926,616
RADIO CONTROLLED GUIDE MEANS AND METHOD FOR USE IN AIRCRAFT LANDING
Filed March 11, 1929    2 Sheets-Sheet 1
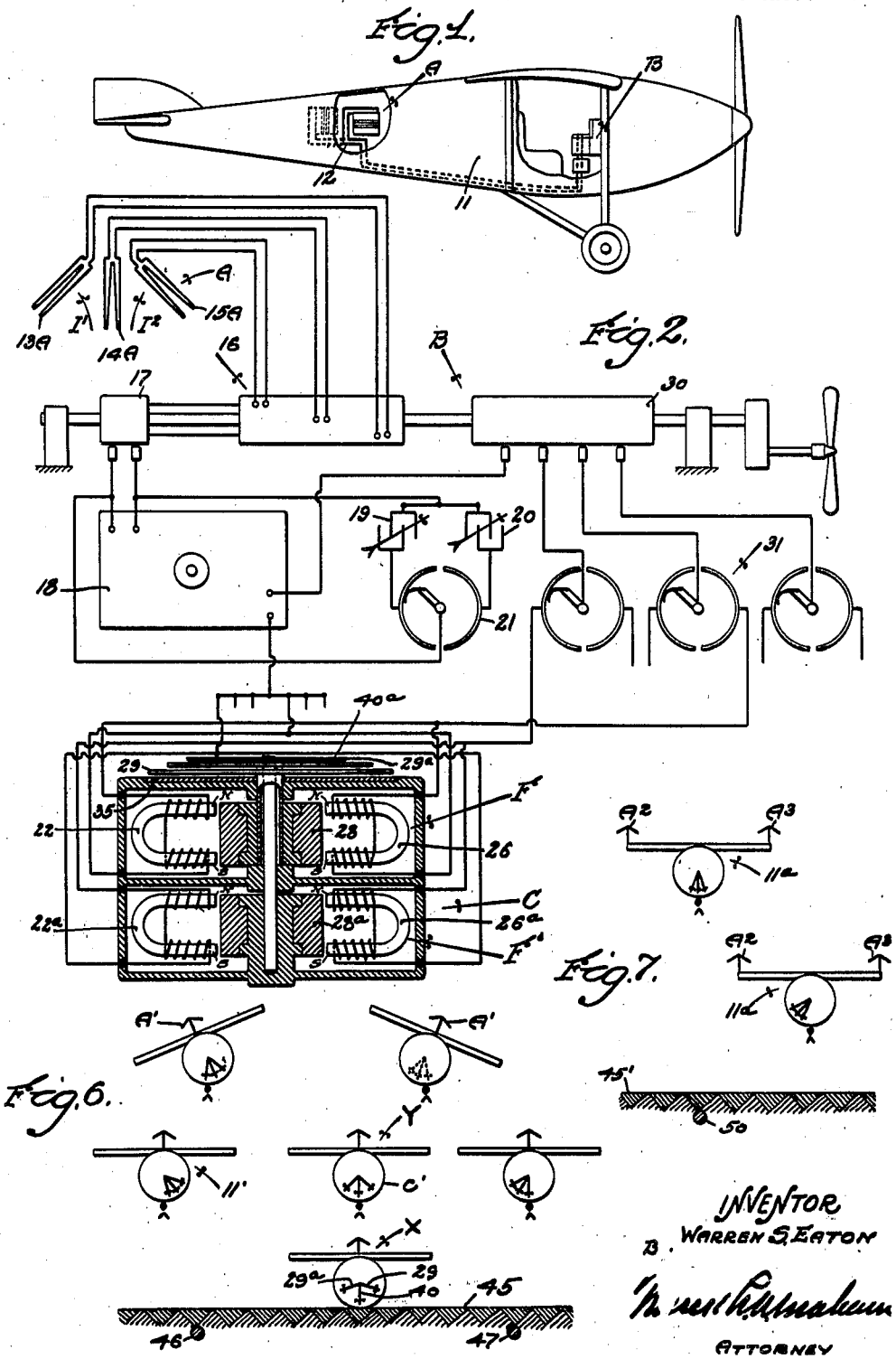

Sept. 12, 1933.   W. S. EATON   1,926,616
RADIO CONTROLLED GUIDE MEANS AND METHOD FOR USE IN AIRCRAFT LANDING
Filed March 11, 1929   2 Sheets-Sheet 2
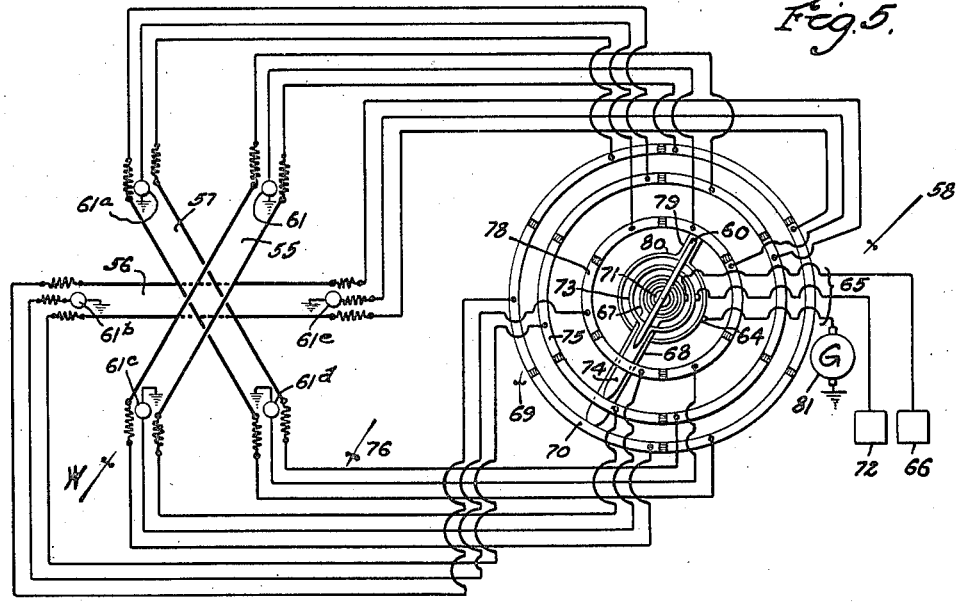
Fig. 5.
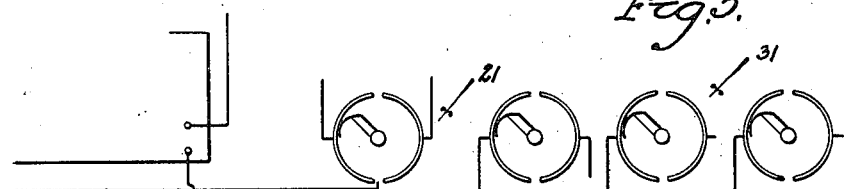
Fig. 3.
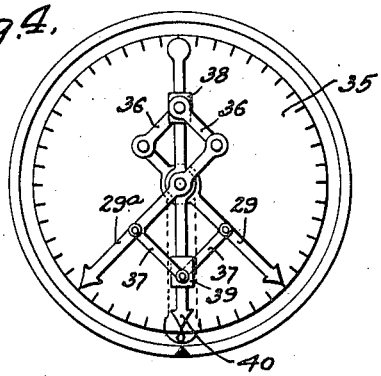
Fig. 4.
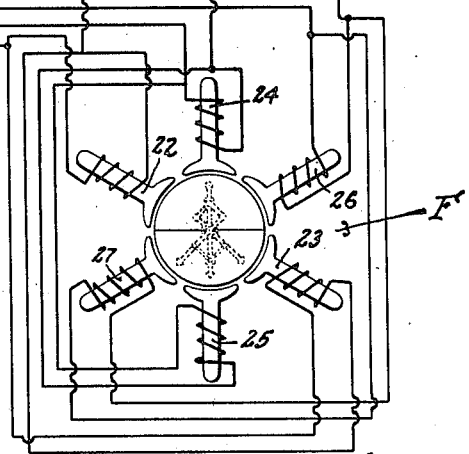
INVENTOR
By WARREN S. EATON
ATTORNEY Patented Sept. 12, 1933

1,926,616

UNITED STATES PATENT OFFICE 1,926,616

RADIO CONTROLLED GUIDE MEANS AND METHOD FOR USE IN AIRCRAFT LANDING

Warren S. Eaton, Los Angeles, Calif., assignor, by mesne assignments, to Eaton Radio Instrument Corporation, Los Angeles, Calif., a corporation Application March 11, 1929. Serial No. 346,039

23 Claims. (Cl. 250—11)

This invention is a combination or system of apparatus embodying elements which cooperate through the medium of radio or electromagnetic energy, to automatically show to the pilot of the aircraft the vertical and radial position of the aircraft relative to a landing field.

The invention may be generally described as comprising a transmitting antenna located longitudinally along the surface of a landing field and directional receiving means mounted on the aircraft and an automatic indicator associated therewith. The indicating means and the transmitting antenna are cooperatively associated through tuning and amplifying means tuned for the particular frequency transmitted through the antenna.

It is an important object of this invention to produce a system of simple form and construction, which is automatic and which while being used in the landing of an airplane or the like, indicates the vertical position of the airplane relative to a landing field and the most advantageous course along which the plane should be landed.

It therefore follows, that it is a noteworthy feature of this invention that the system may be used for landing aircraft after night or during dense fog when the visibility is reduced to such an extent as to make the landing of aircraft hazardous.

It is a further object of this invention to automatically indicate that landing course, of a plurality of landing courses, which is substantially parallel with the direction of the wind and also to indicate the proper direction to land on said course.

It is another object of this invention to provide means which will indicate not only a course parallel with the direction of the wind, but to also indicate the direction in which the wind is blowing in order that an airplane may be "headed into the wind" while being brought to the ground.

It is also an object of this invention to automatically control flood lights so that they may optionally be used to illuminate the landing course along which an airplane is directed.

The details in the construction of a preferred form of the invention together with further objects attending its production will be better understood from the following description of the accompanying drawings which are chosen for illustrative purposes only and in which Fig. 1 is an elevational view with parts broken away to illustrate the manner in which the receiving and indicating means may be incorporated in an airplane.

Fig. 2 is a more or less diagrammatic view showing a preferred form of receiving and indicating means, the indicating unit being shown in sectional elevation.

Fig. 3 is a partial view similar to Fig. 2, showing a diagrammatic face view of the details in a preferred form of indicator construction and illustrates a preferred manner of arranging the indicator relative to the earth (the earth being considered toward the bottom of the sheet).

Fig. 4 is an elevational view showing a preferred form of dial and indicator assembly such as may be used in combination with the indicator shown in Fig. 3.

Fig. 5 is a wiring diagram of a landing field forming a part of the combination embodied in my invention.

Figs. 6 and 7 are diagrammatic views illustrating the manner of using my invention.

Before proceeding with the description of my invention as herein illustrated, reference is made to my copending application Serial No. 348,031 Patent No. 1,842,342, Jan. 19, 1932 in which the details in the construction of the indicating means hereinafter referred to, are more completely described, and it will be understood that while the invention is illustrated as incorporating a preferred form of direction indicating means, that various changes and modifications may be made in this unit as indicated in the copending application above referred to.

More particularly describing the invention as herein illustrated, reference numeral 11 indicates an airplane equipped with a directional antenna unit A and a directional indicating unit B. The directional antenna unit A is illustrated as being pivoted at 12 in order that the unit may be adjusted to the dotted line position shown, which feature makes it possible for the antenna to be used for either vertical or horizontal reception. The normal position of the antenna unit while being used in the combination embodying this invention, is the full line position shown in Fig. 1, in which the antennæ are arranged for the directional reception of vertically directed radio waves.

Figs. 2 and 3 illustrate in more or less detail a preferred form of radio directional indicating unit B similar to a unit described in my aforementioned copending application.

Broadly described, this unit which is associated with a plurality of angularly disposed directional antennæ 13A, 14A and 15A includes antennæ commutating means 16 which intermittently conduct induced currents from the antennæ 13A, 14A and 15A, through a receiving set commutator 17 into the amplifying means 18. The input current delivered to the amplifying means is intermittently tuned through means indicated as comprising variable condensers 19 and 20 associated with a "tuning" commutator 21.

The indicating element C is illustrated as embodying two banks of field pieces F and F'. The bank F consists of oppositely disposed sets of electrically energized field poles 22, 23; 24, 25; 26, 27; and the bank F' embodies a similar unit in which the parts are designated by the same reference numerals distinguished by the suffix "a". Rotors or flux carrying members 28 and 28a are disposed between the respective sets of field pieces and each rotor is adapted to actuate the respective indicators 29 and 29a.

It will be understood that the sets of field pieces are arranged in relative parallelism with the directional antennæ, and that the output of the amplifying set 18 is connected with the field pieces through a field piece commutator 30.

Bank commutating means are illustrated at 31. The bank commutating means being synchronized with the tuning commutator 21, and adapted to permit intermittent current flow through the respective banks of field pieces F and F', it will be understood that resultant fields of force will be intermittently established in the banks of field pieces F and F' which are in the direction of the incoming waves $I_1$ and $I_2$ having frequencies for which condensers 19 and 20 are tuned.

Although the receiving indicating means B have been described as being adapted for determining the direction of two separate radio waves, it is to be understood that the unit may be employed in connection with a single wave. Such a system will be more fully described later in the specification.

It might also be pointed out that in an airplane equipped with a direction indicator such as disclosed in my co-pending application, it is unnecessary to provide an entire set of equipment especially for use in the landing system, but that an adjustable antenna unit A may be used in connection with suitable tuning switches adjusted to the frequency of the landing field antenna, by means of which a single direction indicating unit may be used both for general orientation and for landing.

Referring to Fig. 4 which illustrates a preferred form of indicator or pointer organization particularly adapted for use in combination with a system of the class described, it will be noted that the indicators 29 and 29a are arranged in front of a suitable dial 35 and are connected through suitable links 36 and 37 with sliding sleeves 38 and 39 which are mounted upon opposite ends of a central rotating indicator 40. From this arrangement it will be apparent that the indicator 40 will always indicate a point substantially centralized with respect to the two sources of radio excitation which control the indicators 29 and 29a.

Figs. 6 and 7 indicate diagrammatically two forms in which a system or combination of elements embodied in this invention may be arranged and used.

In Fig. 6 reference numeral 45 indicates a landing field provided with two substantially parallel directional transmitting antennæ 46 and 47 which extend along a landing course above which an airplane 11' is flying.

The airplane 11' is provided with a directional receiving antenna unit A', and indicator C', the banks of which are tuned to receive waves of predetermined frequencies such as may be broadcast from the antennæ 46 and 47.

In the form of the invention shown in Fig. 6 it will be understood that each of the antennæ 46 and 47 will transmit radio waves of a fixed predetermined frequency each of which is different from the other, and that the receiving means in the airplane are so tuned that each of the indicators 29 and 29a points toward one of the antenna, and the central indicator 40 points to the center of the course between the antennæ. The various positions of the airplane shown in Fig. 6 indicate the manner in which the indicator will move relative to the landing course, it will be understood that altitude will effect the relative positions of the indicators as indicated at X and Y in Fig. 6. In this connection it is preferable to calibrate the dial associated with the indicators for a standard setting of the distance between the antennæ wires 46 and 47. The height above the ground of the receiving antennæ set A' when the airplane is on the ground in the center of the course will determine the zero reading on the dial. It therefore follows that with an instrument in which the dial is properly calibrated, when the airplane carrying such an instrument is positioned in a manner such that needle 40 is pointing toward the center of the landing course, the indicators 29 and 29a will show the distance of the airplane above the course, and may be observed in bringing the airplane to the ground.

It is to be understood that the antennæ 46 and 47 are to be properly shielded, and being buried in the ground there will be practically no end radiation, so that the system may be used with great accuracy in landing an airplane.

Fig. 7 illustrates a modification of the system described in connection with Fig. 6 in which the landing field 45' is equipped with a single transmitting antenna 50. The airplane 11a being equipped with two sets of directional receiving antenna $A^2$ and $A^3$, both tune to the frequency of the waves coming from the antenna 50, and preferably positioned near the tips of the wings, it will be understood by those familiar with the art that the operation of the system will be substantially the same as that described in connection with Fig. 6, the central indicator 40, always pointing toward the antenna 50.

It was previously mentioned as an object of this invention to provide a system of the class described which is automatically effective to advise the pilot of an airplane as to the proper course relative to the wind in which to land the airplane. This is accomplished by providing the land field with a plurality of angularly disposed antennæ similar to the one described above and associating these antennæ with a suitable wind controlled switch which is effective to deliver electrical excitation to the antenna which is parallel with the course of the wind. A more complete system in which the direction as well as the course of the wind may be observed, is obtained by providing the angularly arranged antennæ in pairs as indicated in Fig. 6, and providing each pair of antenna with a switch so that each of the antennæ will broadcast waves of given frequency when the wind is blowing in one direction, and the frequencies will be reversed between the antennæ when the direction of the wind changes through 180°.

The manner of arranging a landing field with an antenna system of the class described above is best illustrated in Fig. 5 in which the sets of parallel antennæ 55, 56 and 57 are arranged in fixed angular relation with each other and the parallel antenna wires of each group are connected to a switch 58 which is operated by the wind.

Wind direction will therefore determine which of the pairs of antenna wires are to be charged, and the frequency of excitation of each of the wires will differ in substantially the same manner as explained in connection with antenna wires 46 and 47.

When the wind is blowing in the direction indicated by the arrow W, the wind vane 60 being parallel therewith, the parallel antennæ shown at 55 will be charged with right and left frequencies, that is, the left antenna will be charged with one frequency and the right antenna will carry another frequency.

In addition to governing the delivery of current to the sets of antennæ, the wind operating switch 58 may serve to energize a flood light 61. It will be noted in the illustration that the wind is blowing toward the flood light 61, the purpose being to illuminate the field at a low level and back of the landing position to prevent the light from getting into the pilot's eyes and interfering with his landing. Other flood lights are shown at 61a, 61b, 61c, 61d and 61e for the different pairs of wires and the principle of illuminating the field would be the same.

The "right and left" relation between the individual antennæ is at all times maintained as will be readily indicated by tracing the circuit from the wind control switch. In other words, whether or not a wire is "left" or "right" at a given moment will depend upon the direction of the wind.

As a further check of direction, a standard frequency will at all times be maintained for instance in the right hand wire and the station frequency in the other, and in this manner the pilot can always ascertain whether or not the vehicle is heading into the wind for a proper landing.

It will, of course, be understood that in establishing the standard either the right hand wire or the left hand wire may be selected for radiating the standard frequency.

A further advantage of a two-wire course definer system, the wires of which radiate different frequencies of a predetermined standard, resides in the fact that when the management of the landing field prefers to have the aircraft land on a course in a predetermined direction, the standard of frequencies may be connected to either of the wires.

The details in the construction of the central control switch are illustrated in Fig. 5 as comprising a series of spaced conducting rings with brush contacts 64 and wires 65 leading to said brush contacts.

The standard frequency sending instrument is shown at 66 and is in electrical connection with contact ring 67. A brush arm 68 in constant contact with the contact ring 67 makes connection with a segment ring 69 at segment 70 and ring 69 is divided into twice as many segments as there are pairs of field antennæ.

By following the wiring diagram it will be seen that as the wind vane 60 revolves with the change of wind direction, it will move brush arm 68 to which it is secured through shaft 71 over the contact surface of ring 69 and through electrically connected wires will at all times maintain the standard frequency from transmitter 66 on the same side of the landing course with relation to wind direction. This action is also true for station frequency coming from transmitter 72 with respect to its circular contact 73, brush arm 74, segmental ring 75 and electrically connected wires to the sets of field antennæ 55, 56 and 57 except that the station frequency will always lie on the opposite side of the course from standard frequency.

If the connecting wires indicated generally at 76 for each of the pairs are shielded up to the point of joinder with the sets of buried antennæ 55, 56 and 57, they will not radiate and since the antennæ are shielded against end radiation and the receiving antennæ carried by the plane are uni-directional, as pointed out above, the swing of the indicators 29 and 29a will denote the end of the course when the vehicle passes thereover.

The flood lights 61 etc. are located at ends of the several courses outlined by the parallel antennæ. These lights are, as heretofore mentioned, also controlled by the wind vane 60, being electrically connected through contact ring 78, brush arm 79 and circular contact 80 to generator 81. As before stated these connections are so made that the flood light will be at the pilot's back in landing into the wind or the contact arm be rotated to allow the flood light to be at the front of the pilot if the pilot so desires.

It may be that the pilot will know wind direction, distance above the ground or elevation of the vehicle, but may not know the length of the field. It will be apparent from the description just given that this invention can be utilized for determining the boundaries of the field. In this connection four independent antenna wires acting in pairs surround the field area and these wires are charged with predetermined frequencies as mentioned above. The indicators 29 and 29a being tuned to the frequencies of the boundary antennæ will point to the respective antennæ and if the dial is calibrated for distance with relation to altitude it is possible for the pilot to determine altitude relative to the boundary of the field.

It will be apparent from the foregoing description that this invention embodies a guiding system composed of radiodynamic elements which cooperate to indicate the exact radial and vertical position of an airplane (or other vehicle) relative to a landing or other predetermined course, and although I have confined the description of my invention to a system adapted for use in aerial navigation, it is to be understood that the same apparatus may be readily adapted to nautical use. Ships carrying receiving sets of the class described may be guided through channels etc., by properly positioned transmitting antenna placed in or adjacent to the channel.

While the present invention is based on direction indication and it has been described that the indicator needles will swing into the lines of direction to the sources of the received energy, it will of course be understood that this will occur only when the indicator needles are mounted in an upright position. However, the indicator needles will always turn to the same positions on the dial when indicating the same lines of direction, regardless of the position of the instrument, and therefore it will be understood that the instrument may be read when mounted in a horizontal position as well as in a vertical position.

It is, therefore to be understood, that while I have herein described and illustrated one preferred embodiment of my invention, that the invention is not limited to the precise construction or combination of elements set forth, but includes within its scope whatever changes fairly come within the spirit of the appended claims.

I claim as my invention:

1. A radio operated landing field guide system for use in combination with an airplane, embodying: a transmitting antenna extending longitudinally of a landing course to radiate electromagnetic waves; directional radio receiving means mounted on an airplane; and indicating means automatically operated by said receiving means for visually registering the direction from said airplane to said transmitting antenna.

2. A radio operated landing field guide system for use in combination with an airplane embodying: a plurality of angularly disposed transmitting antennæ each of which extends longitudinally with a landing course to radiate electromagnetic waves of predetermined frequency; directional radio receiving means mounted on an airplane; visual means automatically operated by said receiving means for registering the position of said airplane relative to said transmitting antennæ and a wind operated switch for selecting the antenna to be energized.

3. A radio operated landing field guide system for use in combination with an airplane embodying: a pair of transmitting antennæ extending longitudinally with a landing course, one antenna of said pair radiating a frequency different from that of the other; directional radio receiving means mounted on an airplane to receive the said frequencies; visual means automatically operated by said receiving means for registering the directions to the respective transmitting antenna.

4. A radio operated landing field guide system for use in combination with an airplane embodying: a pair of transmitting antennæ extending longitudinally with a landing course one antenna of said pair radiating a frequency different from that of the other; directional radio receiving means mounted on an airplane to receive the said frequencies; visual means automatically operated by said receiving means for registering the directions to the respective transmitting antenna; and switch means operatively connected with said transmitting antennæ for changing the frequencies of the radiated waves from one transmitting antenna to the other.

5. A radio operated landing field guide system for use in combination with an airplane embodying: a plurality of angularly disposed sets of parallel transmitting antennæ extending longitudinally with a plurality of landing courses on a landing field; wind operated switch means for selectively delivering radio energy to one of said sets of transmitting antennæ; said switch means being operatively connected with the individual sets of antennæ for changing the frequencies of the radiated waves from one antenna to the other of a set, depending upon the direction of the wind; directional radio receiving means mounted on the airplane and tuned to the frequencies of the radiated waves coming from said transmitting antennæ; and visual means automatically operated by said receiving means for registering the direction from said airplane to each of the transmitting antenna.

6. In a radio dynamic system for guiding a vehicle relative to a predetermined course, a transmitting antenna positioned longitudinally with said course, directional receiving means on a vehicle to receive electromagnetic waves from said transmitting antenna, and a visual means automatically operated by said receiving means for registering the direction to said transmitting antenna.

7. A landing field for aircraft having a landing course, a pair of substantially parallel transmitting antennæ extending longitudinally of the landing course and defining said landing course, one antenna radiating a frequency different from that of the other antenna, and means for reversing said frequencies.

8. A landing field for aircraft having a landing course, a pair of substantially parallel transmitting antennæ extending longitudinally of the landing course, one antenna radiating a frequency different from that of the other antenna, and wind operated switch means for reversing said frequencies.

9. A landing field for aircraft having a landing course, a pair of substantially parallel antennæ extending longitudinally of the landing course, one antenna radiating a frequency different from that of the other antenna, flood lights for illuminating the course and located at opposite ends thereof, and means for reversing said frequencies and for selectively actuating the flood lights.

10. A landing field for aircraft having a landing course, a pair of substantially parallel antennæ extending longitudinally of the landing course, one antenna radiating a frequently different from that of the other antenna, flood lights for illuminating the course and located at opposite ends thereof, and wind operated switch means for reversing said frequencies and for selectively actuating the flood lights.

11. A landing field for aircraft having a plurality of angularly disposed landing courses, a pair of parallel transmitting antennæ extending longitudinally of each course, and switch means for selectively connecting the antennæ of any predetermined course with a source of electromagnetic energy for energizing one antenna with a frequency different from that of the other.

12. A landing field for aircraft having a plurality of angularly disposed landing courses, a pair of parallel transmitting antennæ extending longitudinally of each course, and wind operated switch means for selectively connecting the antennæ of the course which is in substantial parallelism with the wind with a source of electromagnetic energy for energizing one antenna with a frequency different from that of the other.

13. A landing field for aircraft having a plurality of angularly disposed landing courses, a pair of parallel transmitting antennæ extending longitudinally of each course, wind operated switch means for selectively connecting the antennæ of the course which is substantially parallel to the wind with a source of electro-magnetic energy for energizing one antenna with a frequency different from that of the other and for reversing the frequencies with a change of 180° in the direction of the wind.

14. A landing field for aircraft having a plurality of angularly disposed landing courses, a pair of parallel transmitting antennæ extending longitudinally of each course, flood lights at opposite ends of the courses for illuminating the respective courses, and means for selectively connecting sources of electro-magnetic energies of different frequencies to the respective antennæ of a predetermined course and for selectively actuating the flood lights of said course.

15. In a radio system for defining landing courses on an aircraft landing field, a plurality of angularly disposed landing courses on a landing field, a pair of parallel transmitting antennæ extending longitudinally of each course, flood lights at opposite ends of the courses for illuminating the respective courses, and wind operated switch means for selectively connecting sources of electro-magnetic energies of different frequencies to the respective antennæ of the course which is in substantial parallelism with the wind and for reversing the frequencies under a change of 180° in the direction of the wind and for selectively actuating the flood lights of said course.

16. A landing field for aircraft having a plurality of angularly disposed landing courses, a pair of parallel transmitting antennæ extending longitudinally of each course, flood lights at opposite ends of the courses for illuminating the respective course, wind operated switch means for selectively connecting sources of electro-magnetic energies to the antennæ of the course which is substantially parallel to the wind with one antenna radiating a frequency different from that of the other and for reversing the frequencies with a change of 180° in the direction of the wind and for selectively actuating the flood lights of said course.

17. The method of determining the position of an aircraft with relation to a landing course, which comprises radiating electro-magnetic energy longitudinally of a landing course, receiving said energy on an aircraft and registering on said aircraft by said received energy the lateral position and the altitude of the aircraft with respect to the course.

18. A radio dynamic system for guiding an aircraft relative to a landing course on a landing field, comprising in combination, means extending longitudinally of the landing course for transmitting electro-magnetic energy, means for receiving the energy on the aircraft, and a single instrumentality actuated by the received energy for simultaneously registering the position and the altitude of the aircraft with respect to the source of energy when the aircraft is over the center of the course.

19. A radio dynamic system for guiding a vehicle relative to a course, comprising in combination, means extending longitudinally of a course for transmitting electro-magnetic energy, means for receiving the energy on a vehicle, means for visually registering the direction from the vehicle to the source of energy, including a pair of concentrically pivoted arms actuated by the received energy to assume predetermined relations to the source of energy, and a pointer pivoted concentric with the arms and operatively connected thereto and actuated thereby to point to the course.

20. A radio dynamic system for guiding a vehicle relative to a course, comprising in combination, means extending longitudinally of a course for transmitting electro-magnetic energy, means for receiving the energy on a vehicle, means for visually registering the direction from the vehicle to the source of energy, including a pair of concentrically pivoted arms actuated by the received energy to assume predetermined relations to the source of energy, and a member operatively connected with said arms and actuated thereby to register the direction to the course.

21. The method of determining the position and altitude of a body with relation to a plurality of fixed known sources of electro-magnetic energy, which comprises receiving the electromagnetic energy from said sources, resolving the energy from said sources into fields of force each of which bears a predetermined directional relation to its source of energy, utilizing said fields of force to register the directions between said fields and said respective sources of energy, utilizing said directions to register the position and altitude of said body relative to said sources.

22. The method of determining the direction from a vehicle to a course, which comprises radiating electro-magnetic energy longitudinally of a course, receiving said energy on a vehicle, resolving said energy into fields of force having different predetermined angular relations to the source of energy, and utilizing said fields of force to visually register the direction to said course.

23. The method of determining the altitude of a body with relation to a plurality of fixed known sources of electro-magnetic energy, which comprises receiving the electro-magnetic energy from said sources, resolving the energy from said sources into fields of force each of which bears a predetermined directional relation to its source of energy, utilizing said fields of force to register the directions between said fields and said respective sources of energy, utilizing said directions to register the altitude of said body relative to said sources.

WARREN S. EATON.